(12) United States Patent
Hu et al.

(10) Patent No.: US 9,712,093 B2
(45) Date of Patent: Jul. 18, 2017

(54) DEVICE AND METHOD FOR INHIBITING VIBRATION OF SUPERCONDUCTING MAGNETIC SUSPENSION ROTOR

(75) Inventors: Xinning Hu, Beijing (CN); Qiuliang Wang, Beijing (CN); Chunyan Cui, Beijing (CN); Hui Wang, Beijing (CN)

(73) Assignee: Institute of Electrical Engineering, Chinese Academy of Sciences, Beijing (CN)

( * ) Notice: Subject to any disclaimer, the term of this patent is extended or adjusted under 35 U.S.C. 154(b) by 1168 days.

(21) Appl. No.: 13/821,415

(22) PCT Filed: Aug. 26, 2011

(86) PCT No.: PCT/CN2011/078981
§ 371 (c)(1),
(2), (4) Date: May 29, 2013

(87) PCT Pub. No.: WO2012/031528
PCT Pub. Date: Mar. 15, 2012

(65) Prior Publication Data
US 2013/0285624 A1 Oct. 31, 2013

(30) Foreign Application Priority Data

Sep. 8, 2010 (CN) .......................... 2010 1 0276940

(51) Int. Cl.
*H02N 15/00* (2006.01)
*H02P 9/00* (2006.01)

(52) U.S. Cl.
CPC ............. *H02P 9/006* (2013.01); *H02N 15/00* (2013.01)

(58) Field of Classification Search
CPC .......... H02K 7/09; H02N 15/00; H02N 15/04; H02N 15/02; F16C 32/0438; G01H 9/004; G01H 9/006

(Continued)

(56) References Cited

U.S. PATENT DOCUMENTS 3,722,288 A * 3/1973 Weber .................... G01V 7/005
73/382 R
4,697,128 A * 9/1987 Matsushita ........... F16C 32/048
310/90.5

(Continued)

FOREIGN PATENT DOCUMENTS

CN       2484547 Y      4/2002
CN     101113896 A      1/2008

(Continued)

OTHER PUBLICATIONS

Cui et al., Machine Translation of CN101113896, Jan. 2008.*

(Continued)

*Primary Examiner* — Quyen Leung
*Assistant Examiner* — Eric Johnson
(74) *Attorney, Agent, or Firm* — The Webb Law Firm

(57) ABSTRACT

A device and a method for inhibiting vibration of a superconducting magnetic suspension rotor. The device comprises a rotor cavity housing, lateral coils, a superconducting rotor with a rotor top plane, a copper plate, pole shoes, a z-axial vibration measuring sensor, an x-axial vibration measuring sensor, a y-axial vibration measuring sensor, and a copper ring, the pole shoes having a spherical inner surface and being arranged symmetrically up and down so as to form a rotor cavity; the annular lateral coils being closely adjacent to an outside cylindrical surface of the rotor cavity housing and fixed to the same; the z-axial vibration measuring sensor being fixed to a central region of the copper plate; the x-axial vibration measuring sensor being mounted along an x-coordinate axis and the y-axial vibration measuring sensor mounted on a on the copper ring which is mounted along an equatorial plane of the rotor.

6 Claims, 2 Drawing Sheets

(58) Field of Classification Search
USPC .......................................................... 310/90.5
See application file for complete search history.

(56) References Cited

U.S. PATENT DOCUMENTS

| | | | | |
|---|---|---|---|---|
| 4,961,352 | A | * 10/1990 | Downer | .............. F16C 32/0438 |
| | | | | 310/90.5 |
| 5,256,637 | A | * 10/1993 | Rao | ..................... F16C 32/0463 |
| | | | | 310/90.5 |
| 5,789,838 | A | * 8/1998 | Gondhalekar | ........ F16C 32/044 |
| | | | | 310/74 |

FOREIGN PATENT DOCUMENTS

| | | | |
|---|---|---|---|
| CN | 101951208 A | | 1/2011 |
| FR | 2727200 A1 | | 5/1996 |
| JP | 01167675 A | * | 7/1989 |

OTHER PUBLICATIONS

Hu et al., Study of an Optical Readout System for Angular Position Detection of the Spin Axis of Superconducting Rotor in Cryogenic Environment, Chinese Journal of Low Temperature Physics, Nov. 2005, pp. 636-638, vol. 27, No. 5. (English-language Abstract attached).

* cited by examiner

DEVICE AND METHOD FOR INHIBITING VIBRATION OF SUPERCONDUCTING MAGNETIC SUSPENSION ROTOR

TECHNICAL FIELD

The present disclosure relates to a device and a method for inhibiting vibration of a rotor, and more specifically relates to a device and a method for inhibiting vibration of a low temperature superconducting magnetic suspension spherical rotor.

BACKGROUND

Some superconductors not only have a zero-resistance effect but also have a Meissner effect. The superconductor may be considered as a perfect diamagnet. Magnetic flux of an external magnetic field can not enter into an interior of the superconductor but are parallel to a surface of the superconductor. A magnetic field direction generated by a superconducting current induced on the surface of the superconductor is just opposite to that of the external magnetic field. The two magnetic fields interact to generate a magnetic thrust. The superconducting rotor can be suspended and rotated, by means of the Meissner effect of the superconductor, and the superconducting rotor may be operated stably without energy loss. Therefore, a variety of precision instruments developed with superconducting characteristics is highly precise and has a quite low energy consumption.

Due to limitations from processing technologies, it is quite difficult to obtain an absolute perfect rotor, and practically there exist various processing variations, which mainly involves two aspects, that is, a mass of the rotor is eccentric and a surface of the rotor is not a perfect sphere. The mass eccentricity of the rotor makes a center of the mass not coincide with a centre of the sphere. Thus, when the rotor rotates about an axis extending through two poles; the rotor is simultaneously subject to a gravity force, an electromagnetic suspension force, and an inertial centrifugal force, so as to make the rotor rotate eccentrically. As a rotational speed of the rotor is increased, vibration of the rotor is continuously increased, and vibration amplitude thereof is continuously increased. When the rotational speed of the rotor is close to a critical rotational speed, the rotor will generate the strongest vibration, and the amplitude reaches a maximum value. An operating rotational speed of the rotor is generally higher than one-order critical rotational speed of the rotor, and thus it is required for an effective means to inhibit vibration of the rotor during a process that the rotor starts, accelerates, and reaches the operating rotational speed. When vibration of the rotor is relatively strong, due to non-absolute homogeneity nature of the superconducting material, the rotor is accompanied with capturing magnetic flux and alternative current loss under vibration, thereby affecting superconducting diamagnetism of the rotor, so that supporting suspension stability and supporting control precision of the superconducting rotor are decreased. A gap between the superconducting rotor and an inner wall of a rotor cavity is generally quite small. As vibration of the rotor is increased, increment of vibration amplitude and vibration energy may cause the superconducting rotor to transiently lose stability, yielding a phenomenon that the superconducting rotor scrapes against the inner wall of the rotor cavity, and thus scratches are formed on an outer surface of the rotor and the inner wall of the rotor cavity, and thus they can no longer be used. In a serious case, it may be possible for the rotor to fall down after scraping and thus damage the system. Therefore, inhibiting vibration during acceleration and deceleration of the rotor is one of key technologies to be urgently solved in research on operation of the superconducting rotor, and effectively controlling vibration of the rotor is also one of necessary conditions with which the superconducting rotor can operate normally and safely.

SUMMARY OF THE PRESENT DISCLOSURE

In order to overcome the defects as mentioned in prior arts so as to effectively inhibit vibration of a superconducting spherical rotor, the present disclosure provides a device and a method for inhibiting vibration of a low temperature superconducting magnetic suspension spherical rotor. The device for inhibiting vibration of the rotor of the present disclosure has a simple structure and has low energy consumption, the method is simple, has a good effect on controlling vibration of the rotor, and can effectively ensure a safe operation of the rotor.

The device of the present disclosure comprises a rotor cavity housing, lateral coils, a rotor top plane, a superconducting rotor, a copper plate, pole shoes, a z-axial vibration measuring sensor, an x-axial vibration measuring sensor, a y-axial vibration measuring sensor, and a copper ring. Inner surfaces of the pole shoes are spherical, the two annular pole shoes are up-down symmetrically disposed so as to form a rotor cavity in which the superconducting rotor is positioned. The two annular lateral coils, namely an upper lateral coil and a lower lateral coil, are closely adjacent to and fixed to an outer cylindrical surface of the rotor cavity housing, respectively. The copper plate with a circular shape is fixed to an upper end face of the rotor cavity housing. The z-axial vibration measuring sensor is fixed to a central region of the copper plate, and an optical axis of the z-axial vibration measuring sensor is perpendicular to the circular rotor top plane, and the z-axial vibration measuring sensor is used to measure a vibration amplitude of the rotor along a z-coordinate axis. The x-axial vibration measuring sensor and the y-axial vibration measuring sensor are respectively mounted on the copper ring in an equatorial plane along an x-coordinate axis and a y-coordinate axis respectively, and optical axes of the x-axial vibration measuring sensor and the y-axial vibration measuring sensor are parallel to the equatorial plane of the rotor and are directed towards a centre of the sphere, and the x-axial vibration measuring sensor and the y-axial vibration measuring sensor are used to measure vibration amplitudes of the rotor along the x-coordinate axis and the y-coordinate axis respectively. A gap between the superconducting rotor and the rotor cavity is in a range of 0.3 mm-0.5 mm when the superconducting rotor is centrally suspended.

According to the present disclosure, a method for inhibiting vibration of a superconducting magnetic suspension rotor comprising steps of: obtaining rotational speed-vibration amplitude curves of the rotor of the above-mentioned device under a plurality of supporting rigidities; then obtaining, according to the rotational speed-vibration amplitude curves of the rotor, a low vibration amplitude by selecting a predetermined supporting rigidity under a predetermined rotational speed under the plurality of supporting rigidities; wherein the plurality of supporting rigidities are realized by applying different currents to the upper lateral coil and the lower lateral coil.

The method of the present disclosure may include the following steps:

1. firstly, applying predetermined currents to the upper lateral coil and the lower lateral coil respectively, so as to allow the superconducting rotor to suspend centrally within the rotor cavity and allow the superconducting rotor to be subjected to a certain supporting rigidity $K_1$; after the conducting rotor starts and accelerates, measuring vibration amplitudes of the superconducting rotor in the directions of x-coordinate axis, y-coordinate axis and z-coordinate axis by the x-axial vibration measuring sensor, the y-axial vibration measuring sensor, and the z-axial vibration measuring sensor respectively, and calculating a resultant vibration amplitude of the superconducting rotor by means of performing a summing operation to a vibration vector along the x-coordinate axis, a vibration vector along the y-coordinate axis, and a vibration vector along the z-coordinate axis, so that a vibration amplitude curve during a process that the superconducting rotor (4) starts, accelerates, and reaches an operating rotational speed is obtained and indicated as $L_1$;

2. then, applying certain currents to the upper lateral coil and the lower lateral coil so as to allow the superconducting rotor to suspend centrally within the rotor cavity and allow the superconducting rotor to be subjected to a certain supporting rigidity $K_2$ which is larger than $K_1$; after the conducting rotor starts and accelerates, measuring vibration amplitudes of the superconducting rotor in the directions of x-coordinate axis, y-coordinate axis and z-coordinate axis by the x-axial vibration measuring sensor, the y-axial vibration measuring sensor, and the z-axial vibration measuring sensor respectively, and calculating a resultant vibration amplitude of the superconducting rotor by means of performing a summing operation to a vibration vector along the x-coordinate axis, a vibration vector along the y-coordinate axis, and a vibration vector along the z-coordinate axis, so that a vibration amplitude curve during a process that the superconducting rotor starts, accelerates, and reaches an operating rotational speed is obtained and indicated as $L_2$; an intersection point between the curve $L_1$ and the curve $L_2$ in a coordinate system consisting of a rotational speed coordinate axis and a vibration amplitude coordinate axis being C, a rotational speed of the superconducting rotor corresponding to the point C being $\omega_B$, a vibration amplitude of the superconducting rotor corresponding to the point C being $A_B$; and 3. finally, when the superconducting rotor starts and accelerates, firstly letting the superconducting rotor to be subjected to the supporting rigidity $K_2$, and when the rotor accelerates to $\omega_B$, changing the currents flowing through the upper lateral coil and the lower lateral coil to thus change the supporting rigidity of the superconducting rotor to $K_1$ from $K_2$ so that the vibration amplitude of the superconducting rotor is not larger than $A_B$ during the whole acceleration process.

The method for inhibiting vibration of a superconducting magnetic suspension rotor of the present disclosure may be: when the superconducting rotor starts, a current of 16-17 A and a current of 18-18.5 A are applied to the upper lateral coil and the lower lateral coil, respectively; when the rotor accelerates and reaches 1200-1250 RPM, the current flowing through the upper lateral coil and the current flowing through the lower lateral coil are rapidly changed to 8-8.5 A and 13-13.5 A, so that the vibration amplitude of the superconducting rotor is not larger than 0.1-0.2 mm during the whole acceleration process.

DESCRIPTION OF THE PREFERRED EMBODIMENTS

Hereinafter the present invention will be further described with reference to the drawings and specific embodiments.

Figure 1:
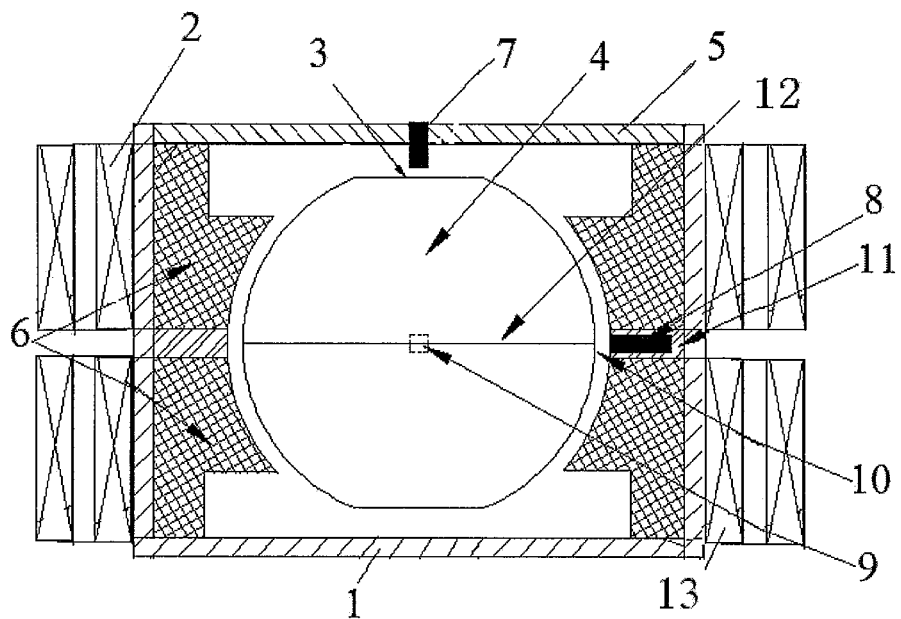
FIG. 1 is a schematic diagram of a device for inhibiting vibration of a superconducting rotor.

As shown in FIG. 1, a device for inhibiting vibration of a superconducting magnetic suspension rotor in accordance with the present invention comprises a rotor cavity housing 1, an upper lateral coil 2, a lower lateral coil 13, a rotor top plane 3, a superconducting rotor 4, a copper plate 5, pole shoes 6, a z-axial vibration measuring sensor 7, an x-axial vibration measuring sensor 8, a y-axial vibration measuring sensor 9, and a copper ring 11. In an exemplary embodiment which is not limiting to the present invention, the vibration measuring sensors are, for example, optical fiber vibration measuring sensors which will be taken as an example in the following description. Inner surfaces of the pole shoes 6 are spherical surfaces and the two pole shoes 6 are arranged symmetrically up and down so as to form a spherical rotor cavity 10. The superconducting rotor 4 is positioned within the rotor cavity 10. The upper lateral coil 2 and the lower lateral coil 13 are closely adjacent to an outer cylindrical surface of the rotor cavity housing 1 and fixed to the surface. The copper plate 5 for example with a circular shape is fixed to an upper end face of the rotor cavity housing 1. The z-axial vibration measuring sensor 7 is fixed to a center region of the copper plate 5. An optical axis of the z-axial vibration measuring sensor 7 is perpendicular to the circular rotor top plane 3. The z-axial vibration measuring sensor 7 is used to measure a vibration amplitude of the rotor 4 along a z-coordinate axis. The x-axial vibration measuring sensor 8 is mounted along the x-coordinate axis and on the copper ring 11 which is mounted along an equatorial plane of the rotor, and the y-axial vibration measuring sensor 9 is mounted along the y-coordinate axis and on the copper ring 11 also. Optical axes of the x-axial vibration measuring sensor 8 and the y-axial vibration measuring sensor 9 are parallel to the equatorial plane 12 of the rotor and are directed towards a centre of the sphere. The x-axial vibration measuring sensor 8 and the y-axial vibration measuring sensor 9 are used to measure vibration amplitudes of the rotor along the x-coordinate axis and the y-coordinate axis respectively.

Figure 2:
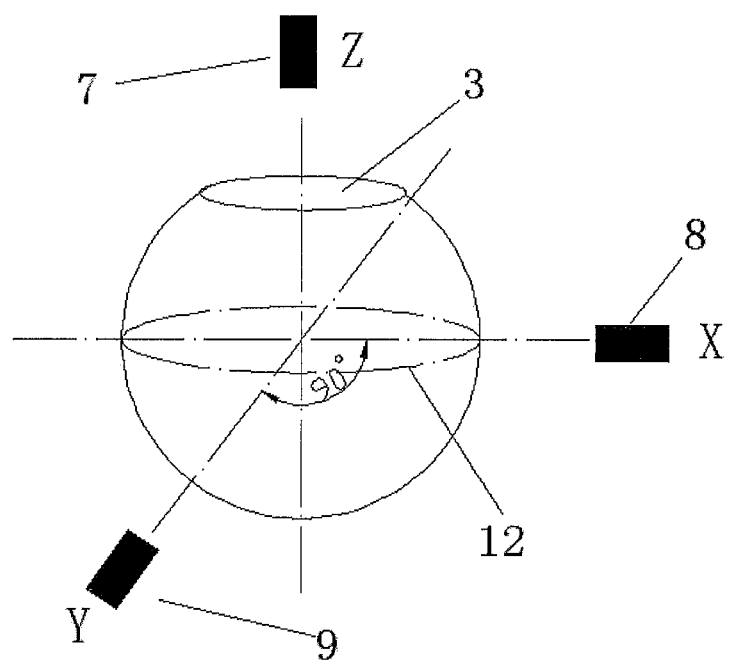
FIG. 2 is a schematic diagram of mounting positions of an x-axial vibration measuring sensor, a y-axial vibration measuring sensor and a z-axial vibration measuring sensor.

As shown in FIG. 2, the z-axial vibration measuring sensor 7 mounted above the rotor top plane 3 is used to measure vibration amplitude of the rotor along the z-coordinate axis. The optical axis of the z-axial vibration measuring sensor coincides with the z-coordinate axis. The optical axes of the x-axial vibration measuring sensor 8 and the y-axial vibration measuring sensor 9 are parallel to the equatorial plane 12 of the rotor and are directed towards the centre of the sphere. The x-axial vibration measuring sensor 8 is mounted along the x-coordinate axis and on the copper ring 11 which is mounted along an equatorial plane of the rotor, and the y-axial vibration measuring sensor 9 is mounted along the y-coordinate axis and on the copper ring 11 also. Both sensors are used to measure vibration amplitudes of the rotor. During a mounting process, optical axes of probes of the x, y, z-axial vibration measuring sensors are respectively directed towards the sphere centre of the rotor, and a distance between a distal end surface of the probe and a surface to be measured is 0.5 mm-2 mm.

By supplying appropriate electric currents through the upper lateral coil 2 and the lower lateral coil 13, the superconducting rotor 4 can be suspended centrally within the rotor cavity 10. In this way, the superconducting rotor 4 can rotate in the rotor cavity 10, without friction, after being activated and accelerated.

Hereinafter, a method for inhibiting vibration of a rotor, by means of the device for inhibiting vibration of the superconducting magnetic suspension in accordance with the present invention as above, will be described with reference to FIG. 3.

Figure 3:
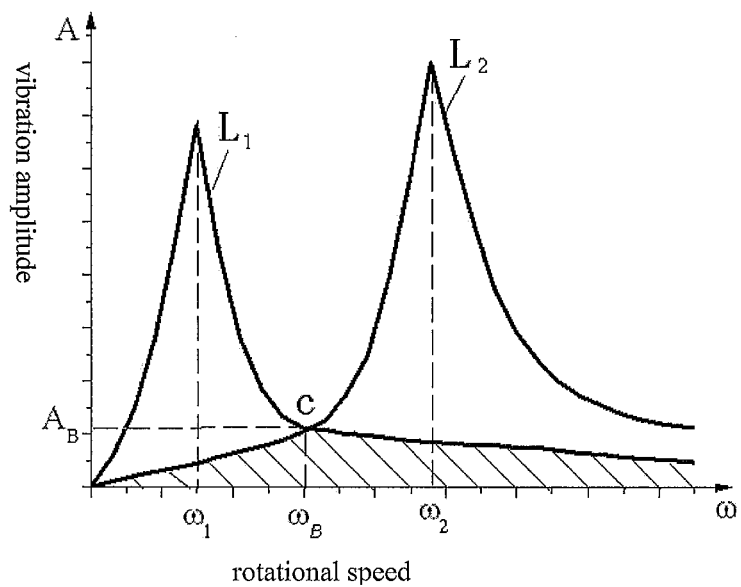
FIG. 3 is a schematic diagram of a vibration amplitude curve of the superconducting rotor.

As shown in FIG. 3, the main idea of the method for inhibiting vibration of a rotor by means of the device for inhibiting vibration of the superconducting magnetic suspension of the present invention lies in: obtaining in advance rotational speed-vibration amplitude curves of the superconducting rotor of the device under different supporting rigidities, for example, by experiments and the like; and then according to the rotational speed-vibration amplitude curves of the rotor under different supporting rigidities, obtaining a low vibration amplitude by selecting a predetermined supporting rigidity under a predetermined rotational speed; wherein the different supporting rigidities are realized for example by supplying different electric currents through the upper lateral coil and the lower lateral coil. The exemplary example of the method is described in details in the following.

The method according to the exemplary example is realized by obtaining two supporting rigidity-rotational speed-vibration amplitude curves in advance and comprises the following steps.

Stage 1: firstly, a first current (for example a current of 8-8.5 A) is applied to the upper lateral coil 2 and a second current (for example a current of 13-13.5 A) is applied to the lower lateral coil 13 so as to allow the superconducting rotor 4 to suspend centrally within the rotor cavity 10 and allow the superconducting rotor 4 to be subjected to a first supporting rigidity $K_1$. After the conducting rotor 4 starts and accelerates, magnitudes of vibration amplitudes of the superconducting rotor 4 are measured by the x-axial vibration measuring sensor 8, the y-axial vibration measuring sensor 9, and the z-axial vibration measuring sensor 7. A summing operation is performed to the x, y, z-axial vibration amplitudes, i.e., calculating a square root of a sum of a square of the x-axial vibration amplitude, a square of the y-axial vibration amplitude, and a square of the z-axial vibration amplitude as a vibration amplitude of the superconducting rotor 4, so that a vibration amplitude curve during the process that the superconducting rotor starts, accelerates, and reaches the operating rotational speed is obtained and indicated as $L_1$.

Stage 2: after that, similarly, a third current (for example a current of 16-17 A) is applied to the upper lateral coil 2 and a fourth current (for example a current of 18-18.5 A) is applied to the lower lateral coil 13 so as to allow the superconducting rotor 4 to suspend centrally within the rotor cavity 10 and allow the superconducting rotor 4 to be subjected to a first supporting rigidity $K_2$ which is larger than $K_1$. After the conducting rotor 4 starts and accelerates, magnitudes of vibration amplitudes of the superconducting rotor 4 in the x, y, z-axial directions are measured respectively the x-axial vibration measuring sensor 8, the y-axial vibration measuring sensor 9, and the z-axial vibration measuring sensor 7. The summing operation is performed to the x, y, z-axial vibration vectors and the result is used as a resultant vibration amplitude of the superconducting rotor 4, so that a vibration amplitude curve during a process that the superconducting rotor starts, accelerates, and reaches the operating rotational speed is obtained and indicated as $L_2$. An intersection point between the curve $L_1$ and the curve $L_2$ in a coordinate system consisting of a rotational speed coordinate axis and a vibration amplitude coordinate axis is indicated as C, and a rotational speed of the superconducting rotor 4 corresponding to the C is $\omega_B$. In an exemplary embodiment, $\omega_B$ has a value of 1200 RPM, and a corresponding vibration amplitude $A_B$ is 0.1-0.2 mm.

Stage 3: finally, when the superconducting rotor 4 starts and accelerates, the superconducting rotor 4 is firstly subjected to the supporting rigidity $K_2$, and when the rotor accelerates to 1200-1250 RPM, the current flowing through the upper lateral coil 2 is rapidly changed to 8-8.5 A and the current flowing through the lower lateral coil 13 is changed to 13-13.5 A, so that the supporting rigidity of the superconducting rotor 4 is changed to $K_1$ from $K_2$. In this way, the vibration amplitude of the superconducting rotor 4 is not larger than $A_B$ during the whole acceleration process, that is, the vibration amplitude is not larger than 0.1-0.2 mm. Based on a fact that a gap between the superconducting rotor 4 and the rotor cavity 10 is in a range of 0.3-0.5 mm, such a vibration of the superconducting rotor 4 during acceleration will not cause the superconducting rotor 4 to scrape against the rotor 1, so that safety is effectively ensured during acceleration of the superconducting rotor 4.

Although the method for performing control by obtaining two supporting rigidity-rotational speed-vibration amplitude curves in advance is described above, it is easily understood for a person skilled in the art that the method may be further refined by obtaining more supporting rigidity-rotational speed-vibration amplitude curves in advance.

Figure 4:
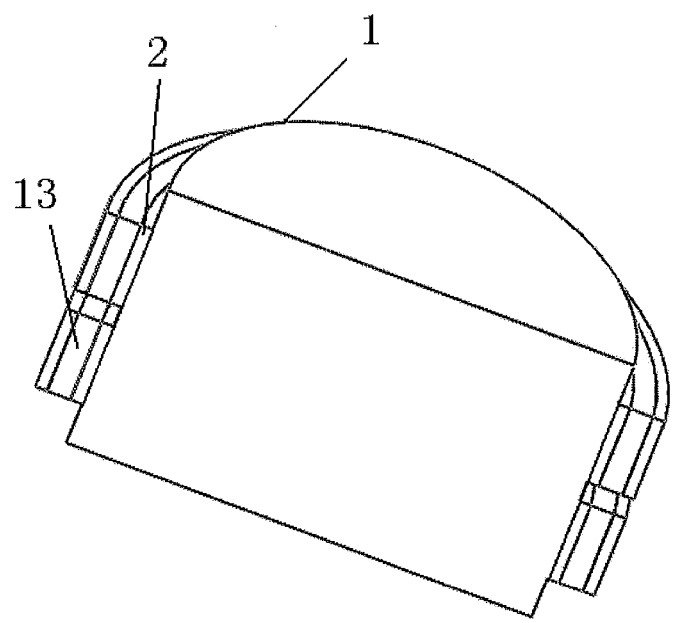
FIG. 4 is schematic diagram of a lateral superconducting coil.

As shown in FIG. 4, the annular upper lateral coil 2 and the annular lower lateral coil 13 are symmetrically provided on an outer cylindrical surface of the rotor cavity housing 1 about the centre of the sphere.

What is claimed is:

1. A method for inhibiting vibration of a superconducting magnetic suspension rotor by using a device for inhibiting vibration of a superconducting magnetic suspension rotor, the device comprising:

a rotor cavity housing, an upper lateral coil, a lower lateral coil, a superconducting rotor with a rotor top plane, a copper plate, two pole shoes a z-axial vibration measuring sensor, an x-axial vibration measuring sensor, a y-axial vibration measuring sensor, and a copper ring, the two pole shoes having a spherical inner surface, the two pole shoes being arranged symmetrically up and down so as to form a rotor cavity;

the superconducting rotor being positioned in the rotor cavity;

the upper lateral coil and the lower lateral coil being closely adjacent to an outside surface of the rotor cavity housing and fixed to the outside surface;

the copper plate being fixed to an upper end face of the rotor cavity housing, the z-axial vibration measuring sensor being fixed to a central region of the copper plate; and the x-axial vibration measuring sensor being mounted along an x-coordinate axis and on the copper ring which is mounted along an equatorial plane of the rotor, the y-axial vibration measuring sensor being mounted along a y-coordinate axis and on the copper ring, the method comprising steps of:

obtaining, by the device, rotational speed-vibration amplitude curves of the rotor of the device under a plurality of supporting rigidities;

then obtaining, according to the rotational speed-vibration amplitude curves of the rotor, a low vibration amplitude by selecting a predetermined supporting rigidity under a predetermined rotational speed under the plurality of supporting rigidities;

wherein the plurality of supporting rigidities are realized by applying different currents to the upper lateral coil and the lower lateral coil.

2. The method of claim 1, wherein said obtaining rotational speed-vibration amplitude curves of the rotor of the device under a plurality of supporting rigidities comprises the steps of:

applying a first current and a second current to the upper lateral coil and the lower lateral coil respectively, so as to allow the superconducting rotor to suspend centrally within the rotor cavity and allow the superconducting rotor to be subjected to a first supporting rigidity ($K_1$);

after the conducting rotor starts and accelerates, measuring vibration amplitudes of the superconducting rotor in the directions of x-coordinate axis, y-coordinate axis and z-coordinate axis by the x-axial vibration measuring sensor, the y-axial vibration measuring sensor, and the z-axial vibration measuring sensor respectively, and calculating a resultant vibration amplitude of the superconducting rotor by means of performing a summing operation to a vibration vector along the x-coordinate axis, a vibration vector along the y-coordinate axis, and a vibration vector along the z-coordinate axis, so that a vibration amplitude curve during a process that the superconducting rotor starts, accelerates, and reaches an operating rotational speed is obtained and indicated as $L_1$;

then applying a third current and a fourth current to the upper lateral coil and the lower lateral coil so as to allow the superconducting rotor to suspend centrally within the rotor cavity and allow the superconducting rotor to be subjected to a second supporting rigidity $K_2$ which is larger than the first supporting rigidity $K_1$;

after the conducting rotor starts and accelerates, measuring vibration amplitudes of the superconducting rotor in the directions of x-coordinate axis, y-coordinate axis and z-coordinate axis by the x-axial vibration measuring sensor, the y-axial vibration measuring sensor, and the z-axial vibration measuring sensor respectively, and calculating a resultant vibration amplitude of the superconducting rotor by means of performing a summing operation to a vibration vector along the x-coordinate axis, a vibration vector along the y-coordinate axis, and a vibration vector along the z-coordinate axis, so that a vibration amplitude curve during a process that the superconducting rotor starts, accelerates, and reaches an operating rotational speed is obtained and indicated as $L_2$; an intersection point between the curve $L_1$ and the curve $L_2$ in a coordinate system consisting of a rotational speed coordinate axis and a vibration amplitude coordinate axis being C, a rotational speed of the superconducting rotor corresponding to the point C being $\omega_B$, a vibration amplitude of the superconducting rotor corresponding to the point C being $A_B$; and wherein said obtaining, according to the rotational speed-vibration amplitude curves of the rotor, a low vibration amplitude by selecting a predetermined supporting rigidity under a predetermined rotational speed under the plurality of supporting rigidities comprises the steps of:

when the superconducting rotor starts and accelerates, letting the superconducting rotor to be subjected to the supporting rigidity $K_2$, and when the rotor accelerates to $\omega_B$, changing the currents flowing through the upper lateral coil and the lower lateral coil to thus change the supporting rigidity of the superconducting rotor to $K_1$ from $K_2$ so that the vibration amplitude of the superconducting rotor is not larger than $A_B$ during the whole acceleration process.

3. The method for inhibiting vibration of the rotor of claim 2, wherein the first current is 8-8.5 A, the second current is 13-13.5 A, $\omega_B$ is 1200-1250 RPM, the third current is 16-17 A, and the fourth current is 18-18.5 A.

4. The method for inhibiting vibration of the rotor of claim 2, wherein said vibration amplitude $A_B$ is 0.1-0.2 mm.

5. The method of claim 1, wherein the z-axial vibration measuring sensor, the x-axial vibration measuring sensor, and the y-axial vibration measuring sensor are optical fiber vibration measuring sensors, and optical axes of the z-axial vibration measuring sensor, the x-axial vibration measuring sensor, and the y-axial vibration measuring sensor are directed towards a sphere center of the rotor.

6. The method of claim 1, wherein the rotor cavity housing is a cylindrical shape, and the upper lateral coil and the lower lateral coil are annular shapes.

* * * * *